(12) United States Patent
Susa et al.

(10) Patent No.: US 6,303,162 B1
(45) Date of Patent: *Oct. 16, 2001

(54) PROCESS OF INJECTING HEAT WITH A PICKLE SOLUTION

(75) Inventors: Yasuyuki Susa, Kawasaki; Toshiya Numazawa, Osaka, both of (JP)

(73) Assignee: Ajinomoto Co., Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,412

(22) Filed: Aug. 19, 1998

(30) Foreign Application Priority Data

Aug. 19, 1997 (JP) ................................. 9-222133

(51) Int. Cl.⁷ ............................ A23L 1/314; A23L 1/318
(52) U.S. Cl. ........................... 426/56; 426/281; 426/641; 426/652
(58) Field of Search ................. 426/52, 56, 59, 426/641, 646, 652, 281; 435/228, 193

(56) References Cited

U.S. PATENT DOCUMENTS

| 5,330,778 | 7/1994 | Stark et al. ........................ 426/531 |
| 5,518,742 | 5/1996 | Soeda et al. ....................... 426/63 |

FOREIGN PATENT DOCUMENTS

| 0745670 | * 4/1996 | (EP) ........................................ 426/59 |
| 94 21130 | 9/1994 | (WO) . |

OTHER PUBLICATIONS

JP 8–51944 (Yamazaki et al) Feb. 27, 1996 (Abstract) [retrieved on Aug. 11, 1999 from JPX/APS.].*
JP 9–206031 (Tanno et al) Aug. 12, 1997 (Abstract) [retrieved on Aug. 11, 1999 from JPX/ABS], Aug. 12, 1997.*
Patent Abstracts of Japan, vol. 014, No. 582 (C–0792), Dec. 26, 1990 & JP 02 255060 A (Ajinomoto Co. Inc.), Oct. 15, 1990 *Abstract*.
Patent Abstracts of Japan, vol. 1996, No. 02, Feb. 29, 1996 & JP 07 255426 A (Ajinomoto Co, Inc.), Oct. 9, 1995 *Abstract*.
Patent Abstracts of Japan, vol. 014, No. 280 (C–0729), Jun. 18, 1990 & JP 02 086748 A (Ajinomoto Co, Inc.), Mar. 27, 1990.
Patent Abstracts of Japan, vol. 007, No. 100 (C–164), Apr. 28, 1983 & JP 58 028234 A (Yukijirushi Niyuugiyou KK), Feb. 19, 1983.
Patent Abstracts of Japan, vol. 1997, No. 6, Jun. 30, 1997 & JP 09 047258, Feb. 18, 1997.
Patent Abstracts of Japan, vol. 015, No. 484 (C–0892), Dec. 9, 1991 & JP 03 210144 A (Ajinomoto Co., Inc.), Sept. 13, 1991.
Patent Abstracts of Japan, vol. 018, No. 553 (C–1263), Oct. 21, 1994 & JP 06 197738 A (Ajinomoto Co., Inc.), Jul. 19, 1994.
Patent Abstracts of Japan, vol. 008, No. 156 (C–234), Jul. 19, 1984 & JP 59 059151 A (Ajinomoto KK), Apr. 4, 1984.

* cited by examiner

Primary Examiner—Arthur L. Corbin
(74) Attorney, Agent, or Firm—Oblon, Spivak, McClelland, Maier & Neustadt, P.C.

(57) ABSTRACT

A curing agent comprising transglutaminase and a protein partial hydrolysate, and a pickle comprising same, having a controlled viscosity.

7 Claims, No Drawings

PROCESS OF INJECTING HEAT WITH A PICKLE SOLUTION

BACKGROUND OF THE INVENTION

1. Field of the Invention

The present invention relates to a curing agent and a pickle which are used to produce a processed meat such as ham, bacon, roast pork or the like. More specifically, the present invention solves a problem of viscosity increase when transglutaminase is used in a pickle, and qualities of a processed meat such as ham, bacon, roast pork or the like are improved when the pickle is injected.

2. Discussion of the Background

Usually, ham, bacon or the like which is a processed meat is required to be cured by law (according to Japanese Agricultural Standard (JAS)). As this method, a dry curing method and the method of curing in a pickle have been conducted. Recently, they have been mostly conducted by a pickle injection method. In the pickle used at that time, sodium chloride and color-fixing agents are main components. In addition, polyphosphates, different, proteins or the like are incorporated to improve yield, water-holding capacity, binding and the like, and seasonings, preservatives, coloring agents and the like are also incorporated.

Further, transglutaminase (hereinafter abbreviated as "TGase") has been lately incorporated at times in a pickle to improve texture, sliceability, i.e., yield of slice, and the like. In this instance, a serious problem is as follows. That is, a pickle, in most cases, is allowed to stand overnight at low temperatures after preparation in order to completely dissolve different proteins or to conduct defoaming through degassing, and is then used. However, there is a problem that when TGase is added and dissolved in this pickle, both TGase and different proteins are reacted while being allowed to stand, and the viscosity of the pickle is notably increased, making it impossible to conduct injection. Accordingly, in order to satisfactorily exhibit the function of TGase, it is necessary to control the viscosity of the pickle, i.e., in other words, to control the TGase reaction). Thus, it is required that even when TGase is added and dissolved in a pickle, the reaction be controlled so as not to increase the viscosity, and the satisfactory effect by using TGase can be exhibited on a processed meat in which the pickle is injected.

To make processed meat which is relatively highly injected, different proteins at the level of 10% have to be incorporated into the pickle. The amount to be added varies depending on qualities of a processed meat required. Generally speaking, typically, soybean protein is between 1 and 8%, casein such as sodium caseinate or the like is between 0.5 and 3%, albumen is between 2 and 5%, and whey protein is between 2 and 5%.

When, for example, from 2 to 5 units of TGase are added to 100 g of this pickle as such, a crosslinking reaction to polymerize protein molecules by TGase proceeds over the course of time, and there occurs a problem that the viscosity of the pickle is increased, making it impossible to conduct injection. For this reason. the use of TGase in the pickle is greatly limited at present. To cope with this, a method is known in which TGase is used in such a state that the amount of soybean protein or casein such as sodium caseinate or the like is decreased in a pickle (Japanese Patent Laid-Open No. 255, 426/1995). However, this method involves problems that since the amount of the protein is limited, the function of the protein is not exhibited satisfactorily and when a long period of time lapses after preparation of the pickle, the viscosity is increased, so that the period of time for which to use the pickle is limited.

Against the above background, an object of the present invention is to provide an excellent pickle in which, when incorporating TGase, the above-mentioned problems are avoided.

SUMMARY OF THE INVENTION

The present inventors have assiduously conducted investigations to solve the above-mentioned problems, and have consequently found that the above-mentioned problems can be successfully addressed with the use of a protein partial hydrolysate as all or part of the protein component. The present invention has been completed on the basis of such a finding.

That is, the present invention relates to a curing agent for meat processing comprising transglutaminase and a protein partial hydrolysate, a pickle in which this is dissolved in water, and a processed meat prepared by using such a pickle. In addition, the present invention relates to a pickle comprising water, transglutaminase and a protein partial hydrolysate, and having a viscosity less than a viscosity of the same pickle wherein the protein partial hydrolysate is replaced with the same protein that is not hydrolyzed.

DETAILED DESCRIPTION OF THE INVENTION

As the protein partial hydrolysate used in the present invention, a partial hydrolysate of a protein which is generally used in a pickle can be used. Examples thereof include partial hydrolysates of casein (including, in addition to free casein, salts such as sodium caseinate and potassium caseinate) soybean protein, albumen, whey protein and plasma.

Of these, it is a soybean protein hydrolysate that increases the viscosity in particular with the addition of TGase. Further, the soybean protein partial hydrolysate imparts an excellent texture to final processed meat in comparison with the other protein partial hydrolysates. Accordingly, the use of a soybean protein partial hydrolysate, among others, especially the soybean protein partial hydrolysate having a hydrolysis rate of from 3 to 20% is quite useful in comparison with the use of other protein partial hydrolysates.

With respect to a pickle comprising TGase, it is a requisite that viscosity increase is limited, but the viscosity may be increased so long as no problems occur in practice. Meanwhile, it makes no sense if the function of TGase and the function of the protein are impaired. It is inevitable that the function of TGase and the desired function provided by the use of the protein are satisfactorily exhibited on processed meat such as ham, bacon, roast pork or the like which is prepared by injecting a pickle having the controlled viscosity.

The soybean protein partial hydrolysate is described in detail below. The soybean protein is generally classified into a soy flour type, a separated protein, and a concentrated protein type. As the protein used in the pickle, the concentrated protein type and the separated protein type are mainly used.

In regard to these types, more native ones are used. However, since these native proteins have a higher reactivity with TGase, the viscosity of the pickle tends to increase. Accordingly, studies have been made on a protein in which the pickle hardly increases the viscosity with the addition of TGase while maintaining the function of these native proteins in the pickle. Consequently, the use of the partially hydrolyzed soybean protein has been found.

The protein partial hydrolysate here referred to is a product obtained by partially hydrolyzing protein, such as soybean protein, with a protein hydrolase, i.e., a protease. As a protease, a protease type (endo type) which cuts a protein molecule successively from an end and a type (exo type) which cuts only a specific site in a molecule are known. In view of controlling the increase in the viscosity, a protein may be treated with any of these proteases. Further, a product which is partially hydrolyzed with a mineral acid such as hydrochloric acid, sulfuric acid or the like is also available.

What is important here is the hydrolysis rate. When a protein which is not hydrolyzed at all is incorporated into a pickle, increase in the viscosity of the pickle is naturally invited. On the contrary, when the hydrolysis rate is extremely high, increase in the viscosity does not occur, but the effect provided by the use of the protein is not exhibited on the product. Therefore, from this standpoint, the hydrolysis rate to meet the object of the present invention is between 2 and 30%, preferably between 3 and 20%. The hydrolysis rate here referred to is; measured as follows. That is, a trichlotoacetic acid (TCA) solution is added to a protein solution having an adjusted solid content such that the final concentration of the TCA solution reaches 0.2 M. The mixture is stirred, then maintained at 40° C. for 20 minutes, and centrifuged. The total nitrogen amount of the supernatant portion is measured. This nitrogen amount is multiplied by 6.25 to calculate the protein amount of the supernatant portion, and this protein amount is divided by the initial protein amount of the overall solution. The resulting value is defined as a hydrolysis rate.

The amount of the soybean protein in the protein partial hydrolysate used in the present invention is not particularly limited. Generally, it can be the amount of a soybean protein generally used in the pickle. That is, generally with respect to an amount of a soybean protein used in a pickle, it is about between 1 and 8% of the pickle, as described earlier. This amount can be replaced as such with that of the protein partial hydrolysate.

TGase used to prepare the pickle includes both a calcium dependent and a calcium-independent TGase, and both can be used in the present invention. As the former, TGase derived from microorganisms (for example, Japanese Patent Laid-Open No. 27,471/1989) can be mentioned. As the latter, TGase derived from a guinea pig liver (Japanese Patent Publication No. 50,382/1989), TGase derived from fish (for example, Seki Nobuo et al., "NIPPON SUISAN GAKKAISHI, vol. 56, 125–132 (1990)"; and "1990th The Japanese Society of Fisheries Science, Annual Meeting in Spring Abstracts, p. 219), and TGase present in the blood or the like, which is called factor XIII (WO 93/15234) can be mentioned. Further, TGase produced through recombination (Japanese Patent Laid-Open Nos. 300,889/1989; 225,775/1994; and European Patent Laid-Open No. EP-0693556A) can all be used. The origin and the process for producing the same are not limited.

The amount of TGase used is the same as the amount which is ordinarily used to make ham or bacon (Japanese Patent Laid-Open No. 255,426/1995 and the like). Naturally, the amount of TGase added to the pickle varies depending on the amount to be injected in meat. Usually, with respect to ham, the amount of from 5 to 15 units per 100 g of the ham product is considered appropriate. Accordingly, when a pickle is injected into pork at an extension level of 50%, from 10 to 30 units of TGase per 100 g of the pickle have to be added according to the calculation. However, in general, it is sufficient to incorporate from 2 to 30 units of TGase per 100 g of the pickle. When the amount of TGase, i.e., the addition level of TGase, is smaller than this, the effects of improvement of properties, i.e., improvement of texture, improvement of binding, and the like, of ham by TGase are not obtained. When the amount of TGase, i.e., the addition level of TGase, is larger than this, texture is extremely and inconveniently hard. Anyway, when the amount deviates from the above-mentioned range, the desired objects are not provided.

The activity unit of transglutaminase referred to in the present invention is measured and defined by a method in which the reaction is conducted using benzyloxycarbonyl-L-glutaminylglycine and hydroxylamine as substrates, an iron complex is formed using the resulting hydroxamic acid in the presence of trichloroacetic acid, an absorbance of 525 nm is then measured, and the amount is found from a calibration curve (Japanese Patent Laid-Open No. 27,471/1989).

The curing agent and the pickle of the present invention can be produced according to a usual method of producing a curing agent and a pickle except that a predetermined amount of TGase is added and dissolved, and various protein partial hydrolysates including the soybean protein partial hydrolysate are used in the production, and no special means or incorporation is required at all. Needless to say, the method for producing processed meat can follow a conventional method. Further, the curing agent and the pickle of the present invention can of course be subjected to distribution as such.

EXAMPLES

Having generally described this invention, a further understanding can be obtained by reference to certain specific examples which are provided herein for purposes of illustration only and are not intended to be limiting unless otherwise specified.

Example 1

In the evaluation of soybean protein in a gel, 7.5% solutions were prepared using three products (unhydrolyzed proteins) selected on the basis of the degree of NSI (water-soluble nitrogen index) shown in Table 1 below and one product partially hydrolyzed with a protease. To each of these solutions was added a TGase preparation "Activa TG-S" (made by Ajinomoto Co., Inc., specific activity 100 units/g) such that it reached 7.5 units per 100 g of a pickle. The pickle was then incubated at 25° C. for 24 hours. The viscosity of the product was measured according to the lapse of time shown in Table 2 below using a B-type viscometer "Vismetron" Rotor No. 2 supplied by Shibaura Seisakusho.

The results are also shown in Table 2. The hydrolysis rate of "Ajipron"—HO, i.e., a soybean protein partial hydrolysate obtained by partially hydrolyzing a soybean protein with a protease was approximately 7.5%.

TABLE 1

| Soybean protein | NSI5 | Protease treatment | Hydrolysis rate |
|---|---|---|---|
| "Ajipron"-HS2 | 92.3 | No | — |
| "Ajipron"-SU | 79.2 | No | — |
| "Ajipron"-SY | 59.6 | No | — |
| "Ajipron"-HO | 89.8 | Yes | 7.5% |

(NS15 - water-soluble nitrogen index at 5° C.)

TABLE 2

| Time that lapses (hrs) | 0 | 2 | 6 | 12 | 24 |
|---|---|---|---|---|---|
| "Ajipron"-HS2 | 9 | 11 | 103 | — | — |
| "Ajipron"-SU | 20 | 38 | 280 | — | — |
| "Ajipron"-SY | 46 | 72 | 350 | — | — |
| "Ajipron"-HO | 8 | 8 | 8 | 10 | 23 |

—: unmeasurable

As is easily understandable from Table 2, the three products which are not treated with an enzyme show an abrupt increase in the viscosity irrespective of the degree of NSI, whereas "Ajipron"—HO (made by Ajinomoto Co., Inc.), an enzyme-treated protein, shows only a slight increase in the viscosity even after 24 hours. The three products not treated with an enzyme are also those made by Ajinomoto Co. Inc., and they are all isolated soybean proteins.

Example 2

A pickle was prepared according to a recipe shown in Table 3 below. To this was added a TGase preparation "Activa" TG-S (made by Ajinomoto Co., Inc., specific activity 100 units/g) at a ratio of 0.0% (0 unit per 100 g of the pickle), 0.15% (15 units on the same basis), 0.20% (20 units on the same basis) or 40% (40 units on the same basis). The mixture was allowed to stand at room temperature of 5° C., and the viscosity thereof was measured over the course of time shown in Table 4 below. The results are also shown in Table 4. The viscosity remains unchanged naturally in the absence of TGase. However, even when TGase is added at a ratio of 0.2% which is presumably an appropriate amount, the viscosity is slightly increased. The viscosity exceeds 100 cp for the first time after 48 hours. Thus, this ratio is considered satisfactorily practical. With the addition of TGase at a ratio of 0.4%, the viscosity is abruptly increased, and the practical use at this ratio is found to be difficult. Further, this proves that the optimum viscosity can be selected by selecting the amount of TGase added. These results are quite suggestive.

TABLE 3

| Pickle | (a) | (b) | (c) | (d) % |
|---|---|---|---|---|
| Sodium chloride | 3.70 | 3.70 | 3.70 | 3.70 |
| Sugar | 2.50 | 2.50 | 2.50 | 2.50 |
| "Ajinomoto" (*1) | 0.60 | 0.60 | 0.60 | 0.60 |
| Sodium nitrite | 0.04 | 0.04 | 0.04 | 0.04 |
| AscNa (*2) | 0.16 | 0.16 | 0.16 | 0.16 |
| Polyphosphate | 0.80 | 0.80 | 0.80 | 0.80 |
| Dextrin | 5.50 | 5.50 | 5.50 | 5.50 |
| Sodium caseinate | 2.00 | 2.00 | 2.00 | 2.00 |
| Whey protein | 2.00 | 2.00 | 2.00 | 2.00 |
| Powdery albumen | 2.50 | 2.50 | 2.50 | 2.50 |
| "Ajipron"-HO | 3.50 | 3.50 | 3.50 | 3.50 |
| "Activa"TG-S | 0.0 | 0.15 | 0.20 | 0.40 |
| Water | 76.90 | 76.55 | 76.50 | 76.30 |
| Total | 99.60 | 99.60 | 99.60 | 99.60 |

*1: umami seasoning composed mainly of monosodium glutamate (made by Ajinomoto Co., Inc.)
*2: Sodium ascorbate

TABLE 4

| TG concentration ratio (%) | Time that lapses (hrs) | | | | (cp) |
|---|---|---|---|---|---|
| | 0 | 6 | 24 | 32 | 48 |
| (a) 0.0 | 22 | 22 | 22 | 22 | 22 |
| (b) 0.15 | 22 | 22 | 30 | 35 | 70 |
| (c) 0.20 | 22 | 22 | 45 | 70 | 135 |
| (d) 0.40 | 22 | 45 | 285 | 340 | — |

—: unmeasurable

Example 3

With respect to "Ajipron"—HO, a product of the present invention, the comparative experiment was conducted on the basis of the recipe (c) in Table 3 of Example 2, using "Ajipron"-HS2 selected in Example 1 as a control. Consequently, the results shown in Table 5 below were obtained.

TABLE 5

| Soybean protein | TGase | Viscosity after 24 hours (cp) | Evaluation of expert panelists on qualities of ham |
|---|---|---|---|
| "Ajipron"-HO (Partial hydrolysate) | Non-addition | 22 | Soft, smooth, and slightly unpleasant texture |
| | Addition | 25 | Firm and quite pleasant texture with good bite |
| "Ajipron"-HS2 (Common product) | Non-addition | 22 | Soft and unpleasant texture with weak bite |
| | Addition | 120 | Slightly hard and slightly tough texture. However, the viscosity of the pickle is high, injection is difficult and workability is quite bad. |

As seen from Table 5, when TGase is added to "Ajipron"—HS2, a common product (unhydrolyzed protein), the viscosity exceeds 100 cp. Meanwhile, when "Ajipron"—HO, a partial hydrolysate, is used, the viscosity is little increased even with the addition of TGase.

Further, the pickle after 24 hours was actually injected into pig loin, and ham was prepared in a usual manner. Qualities thereof were then evaluated. As a result, qualities of ham prepared by using both the soybean partial hydrolysate and TGase were very good. Further, a pickle obtained from a combination of the protein partial hydrolysate and TGase resulted in a lesser increase in viscosity, and the workability was extremely good.

When TGase is ordinarily used in a prepared meat product such as ham or the like through a pickle, different proteins contained previously in the pickle, especially a vegetable protein such as a soybean protein or the like is reacted with TGase to notably increase the viscosity of the pickle. For this reason, the use of TGase has been greatly limited.

However, according to the present invention, a protein partial hydrolysate, preferably, a soybean protein partial hydrolysate, more specifically, a soybean protein partial hydrolysate having a specific hydrolysis rate is combined with TGase, whereby limitations on the use of TGase is greatly reduced without increasing the viscosity of the pickle. Further, the function of TGase and the function of the soybean protein are satisfactorily exhibited on prepared meal product such as ham, bacon or the like upon using this pickle, making it possible to satisfy the inherent functions thereof. In other words, according to the present invention, the viscosity of the pickle containing TGase can be controlled by selectively using the protein partial hydrolysate of the soybean protein or the like. Thus, the use of TGase in a prepared meat product is greatly expanded. Still further, TGase is used in prepared meat product, making it possible to produce a product having an improved texture, an improved slice yield during the production and an excellent binding capacity at a low cost.

Thus, it contributes very much toward the production of prepared meat products.

The disclosure of japan patent application no. 222133/1997, filed Aug. 19, 1997, of which application priority is claimed, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed is:
1. A method for producing a processed meat comprising:
   (a) preparing a pickle solution comprising transglutaminase and 1 to 8% by weight of a protein partial hydrolysate; and
   (b) injecting the pickle solution into a meat.
2. The method of claim 1, wherein the protein partial hydrolysate is a soybean protein partial hydrolysate.
3. The method of claim 1, wherein the protein partial hydrolysate has a hydrolysis rate from 2 to 30%.
4. The method of claim 1, wherein the protein partial hydrolysate has a hydrolysis rate from 3 to 20%.
5. The method of claim 1, wherein the transglutaminase is present in an amount from 2 to 30 units per 100 g of the pickle solution.
6. The method of claim 1, wherein the pickle solution has a viscosity less than the viscosity of the same pickle solution in which the protein partial hydrolysate is replaced with the same protein that is not hydrolyzed.
7. The method of claim 1, wherein the processed meat is selected from the group consisting of ham, bacon, and roast pork.

* * * * *